(12) United States Patent
Bouyer

(10) Patent No.: US 6,413,043 B1
(45) Date of Patent: Jul. 2, 2002

(54) INLET GUIDE VANE AND SHROUD SUPPORT CONTACT

(75) Inventor: Mark Jeffery Bouyer, Reading, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/710,677

(22) Filed: Nov. 9, 2000

(51) Int. Cl.[7] ............................................... F01B 25/02
(52) U.S. Cl. ....................... 415/159; 415/160; 384/117; 384/306; 29/522.1; 29/451
(58) Field of Search ................................ 415/160, 159, 415/161, 162, 229, 150, 148; 384/117, 119, 122, 306, 307; 29/522.1, 451, 458

(56) References Cited

U.S. PATENT DOCUMENTS

| | | | | |
|---|---|---|---|---|
| 4,514,141 A | * | 4/1985 | Marey | 415/160 |
| 5,328,327 A | * | 7/1994 | Naudet | 415/160 |
| 5,517,817 A | * | 5/1996 | Hines | 60/39.75 |
| 5,636,968 A | * | 6/1997 | Audet et al. | 415/160 |
| 5,807,072 A | * | 9/1998 | Payling | 415/170 |

* cited by examiner

Primary Examiner—F. Daniel Lopez
Assistant Examiner—James M McAleenan
(74) Attorney, Agent, or Firm—William Scott Andes; Pierce Atwood

(57) ABSTRACT

An assembly for coupling together in a turbofan engine the guide vane and the inner vane shroud. The assembly includes a bushing positioned within a shroud port for receiving the inner trunnion of the vane. A washer located between the bushing and a trunnion button of the vane provides substantial retaining contact between the bushing and the vane. A shroud retainer affixed to the inner surface of the shroud captures the bushing in the shroud port. The retainer preferably spans a series of shroud sections for as much as about one-half of the entire circumference of the shroud. The combination of the washer and the retainer with significant span reduces movement between the shroud and the vane. Wear on the vane trunnion is therefore reduced and maintenance obligations correspondingly reduced.

8 Claims, 5 Drawing Sheets

INLET GUIDE VANE AND SHROUD SUPPORT CONTACT

BACKGROUND OF THE INVENTION

This invention relates generally to gas turbine engines and more particularly to inlet guide vanes and shroud supports for such engines.

A turbofan gas turbine engine used for powering an aircraft in flight typically includes, in serial flow communication, a fan, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan and the booster via a second rotor shaft.

The high pressure compressor typically includes a series of stator vane stages used to compress air for engine and aircraft use. The first compressor stage adjacent to the booster is the inlet guide vane stage formed of a plurality of circumferentially arranged cantilevered inlet guide vanes. The inlet guide vanes may be actuated through a control system so as to optimize air flow for power and stall avoidance purposes. The guide vanes are retained between a stator case and an inner vane shroud. The stator case is coupled to the engine case. The space between the stator case and the shroud defines the volume of air passing through the high pressure compressor. The shroud provides an aerodynamic flowpath boundary of the high pressure compressor.

In some engines, the inlet guide vanes as well as other downstream stator vanes are variably actuated through the operation of one or more controllable vane actuators. An outer trunnion or spindle of the vane passes through the stator case and is coupled to a lever arm. The lever arm is coupled to an actuation ring that is connected to a vane actuator. One or more vane actuators effect movement to the series of circumferentially arranged stator vanes of each compressor stage. The vane is retained to the stator case through a combination of bushings, washers, and a lock nut that is threaded onto the outer trunnion.

The vane also includes an inner trunnion at its opposing end. That inner trunnion is used to retain the vane to the inner vane shroud. In most cases, a plurality of vanes spanned and retained by one shroud section. A plurality of shroud sections extends completely around the inner circumference of the compressor to retain all vanes. The inner trunnion of the vane is removably affixed to the shroud by way of a bushing. In addition, two shroud pins, one at each of the inner trunnions of the two end vanes of a particular shroud section, secure the shroud section to that set of vanes. For example, a shroud section made for five is secured to the inner trunnions of those five vanes by way of bushings. That is the only securing mechanism for the three interior vanes. The two outer vanes of the shroud section each has a modified inner trunnion or spindle with a hemispherical cut-out for accepting a retaining pin. The retaining pin passes transversely through the bushing and is designed to remain captured in the hemispherical cutout of the modified inner trunnion.

Groups of shroud sections are coupled together through a common shroud retainer or seal. The shroud retainer is designed to capture flanges or wings of the shroud sections below the inner trunnion. In those turbine engines where shroud retainers are employed, they are formed-to provide coverage to approximately one-quarter of the inner circumference of the compressor stage. That is, they extend approximately 90° of the inner 360° circumference, thereby capturing a plurality of shroud sections. Linking a series of vanes together using the shroud sections and then coupling a series of shroud sections together using the set of shroud retainers is intended tighten together the vanes. That along with the shroud pins is designed to reduce vane loosening, much like the spokes of a bicycle wheel are captured and retained together on a wheel hub.

Unfortunately, constant aerodynamic pressure forces associated with the operation of the high pressure compressor force movement of the inner shroud toward the stator case. The stress of that movement on the vane causes disparate movement between the inner trunnion of the pinned vanes and their associated shroud pins. The shroud pin provides very little retaining contact with respect to the vane trunnion. It therefore cannot bear the aerodynamic loads and friction from vane actuation and engine vibrations for the desired life expectancy of that portion of the compressor. Therefore, what is needed is a vane to shroud contact arrangement that will secure the vane to the shroud with reduced movement and resultant wear under expected engine operating conditions.

SUMMARY OF THE INVENTION

The above-mentioned need is met by the present invention, which provides a coupling assembly for retaining a rotatable structure to a fixed casing. The coupling or contact assembly includes a bushing designed to pass through the port of the segmented accurate inner shrouds and to retain the rotatable structure and a washer disposed within the port and positioned by way of a recessed hole in the shroud. A retainer removably coupleable to the inner shroud and disposed thereon captures the bushing between the inner shroud and the retainer. The assembly is suitable for use with turbofan engines having compressor stages. As previously indicated, the inlet guide vane stage of the compressor includes a plurality of variable guide vanes disposed between the stator casing and the inner vane shroud. The contact assembly of the present invention includes for each vane-to-shroud contact assembly a bushing removably retained within a port of the vane shroud for receiving the trunnion of the vane. The assembly also includes a washer positioned between a contact face of either the bushing or the inner shroud recessed hole shoulder and a trunnion button of the vane. Finally, a shroud sealing retainer removably coupleable to the outer surface of the shroud and disposed thereon captures the bushing between the washer and that retainer.

The present invention and its advantages over the prior art will become apparent upon reading the following detailed description and the appended l claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
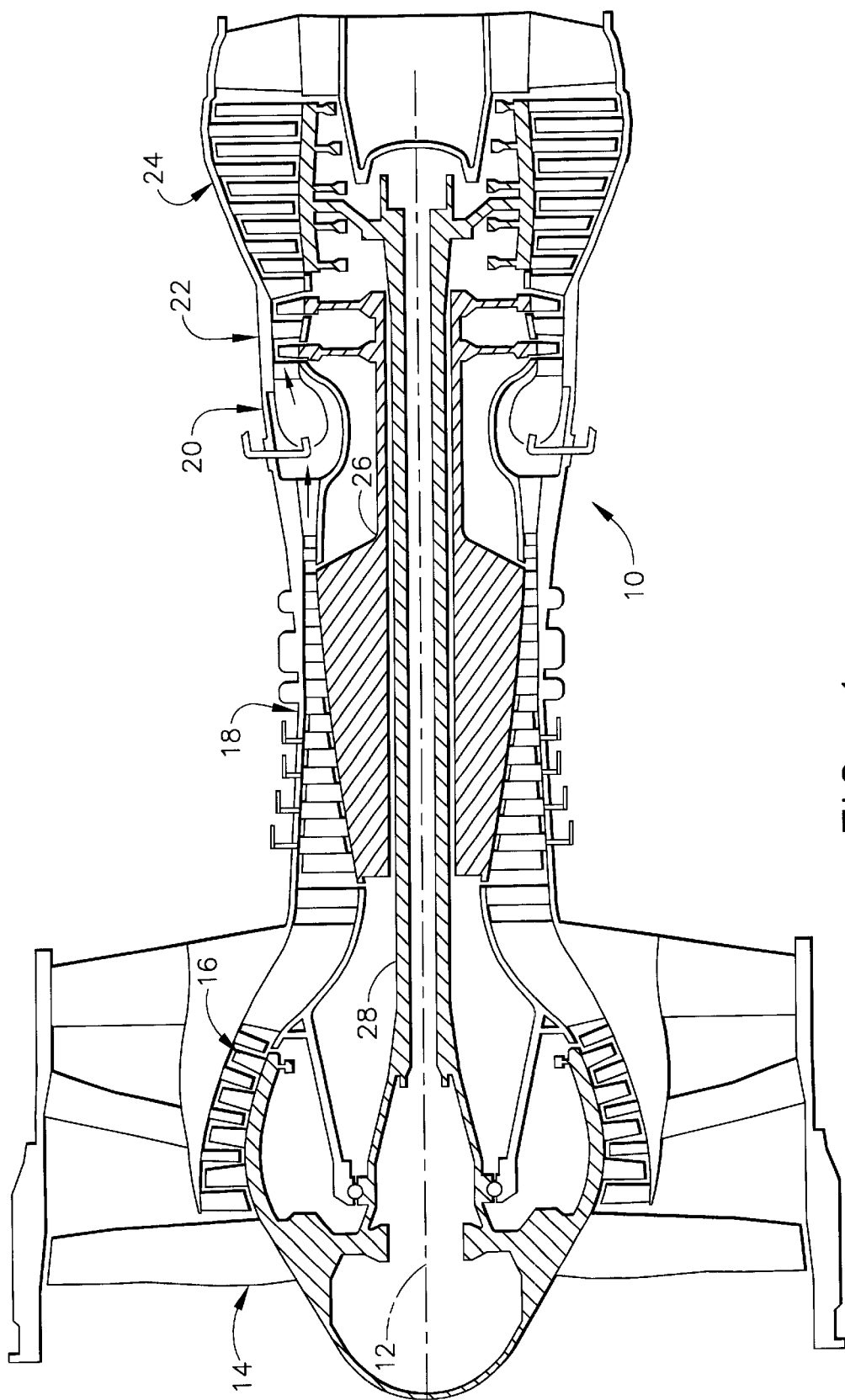
FIG. 1 is a partial schematic cross-sectional view of a turbofan engine incorporating the inlet guide vane coupling system of the present invention.

Referring to the drawings wherein identical reference numerals denote the same elements, FIG. 1 illustrates a longitudinal cross-sectional view of a high bypass ratio turbofan engine 10. The engine 10 includes, in serial axial flow communication about a longitudinal centerline axis 12, a fan 14, a booster 16, a high pressure compressor 18, a combustor 20, a high pressure turbine 22, and a low pressure turbine 24. The high pressure turbine 22 is drivingly connected to the high pressure compressor 18 with a first rotor shaft 26, and the low pressure turbine 24 is drivingly connected to both the booster 16 and the fan 14 with a second rotor shaft 28, which is disposed within the first rotor shaft 26.

During operation of engine 10, ambient air passes through the fan 14, the booster 16, and the compressor 18 to be pressurized in succession. Some of the ambient air is bled off for supplemental functions while the primary pressurized air stream enters the combustor 20 where it is mixed with fuel and burned to provide a high energy stream of hot combustion gases. The high-energy gas stream passes through the high-pressure turbine 22 where it is further expanded, with energy being extracted to drive the first rotor shaft 26. The gas stream then passes through the low-pressure turbine 24 where energy is extracted to drive the second rotor shaft 28 and, thus, the fan 14. Spent products of combustion and unused gas pass out of the engine 10 through an exhaust duct.

Figure 2:
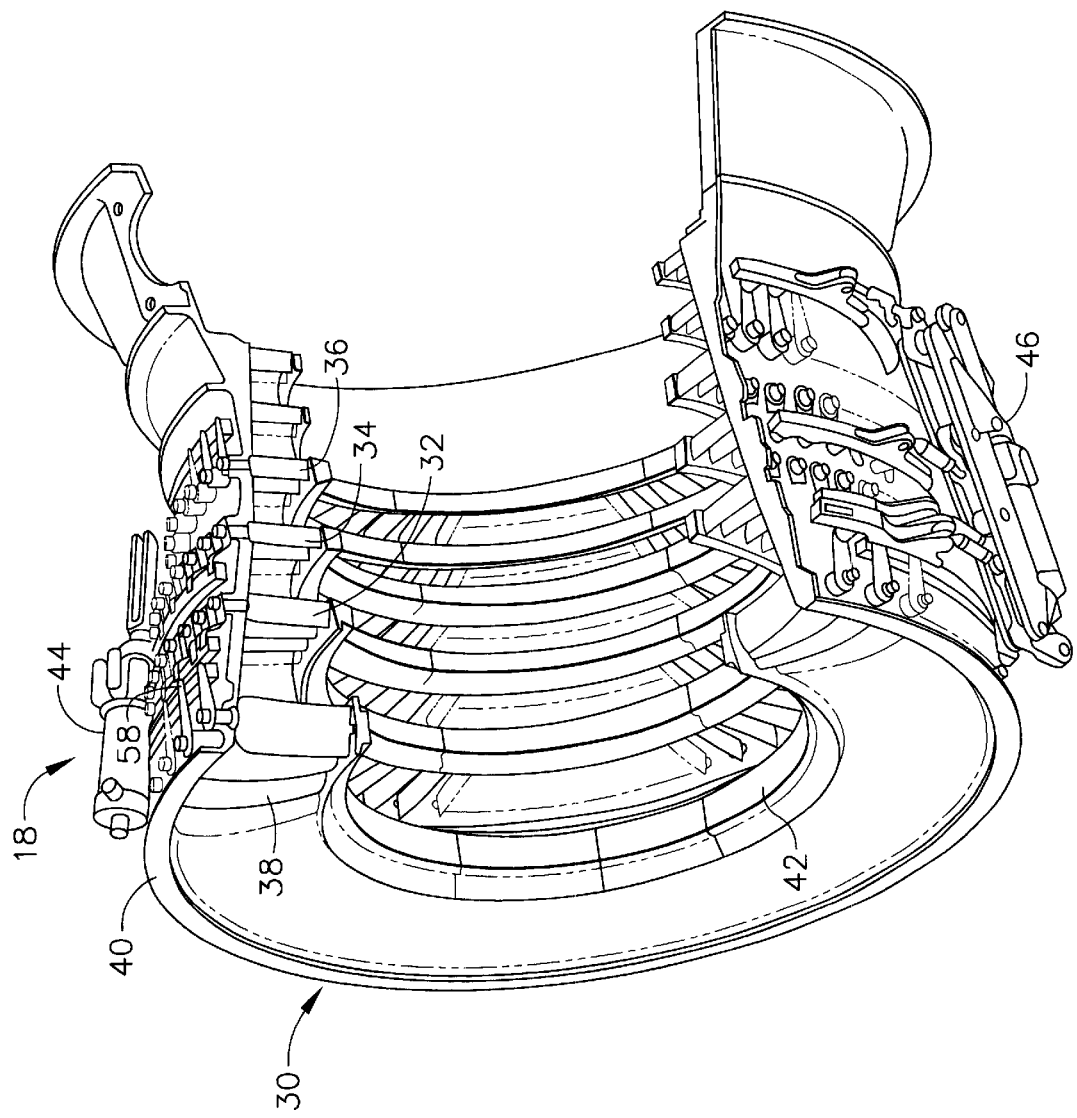
FIG. 2 is a partial cut-away perspective view of the high pressure compressor section of the engine of FIG. 1.
Figure 3:
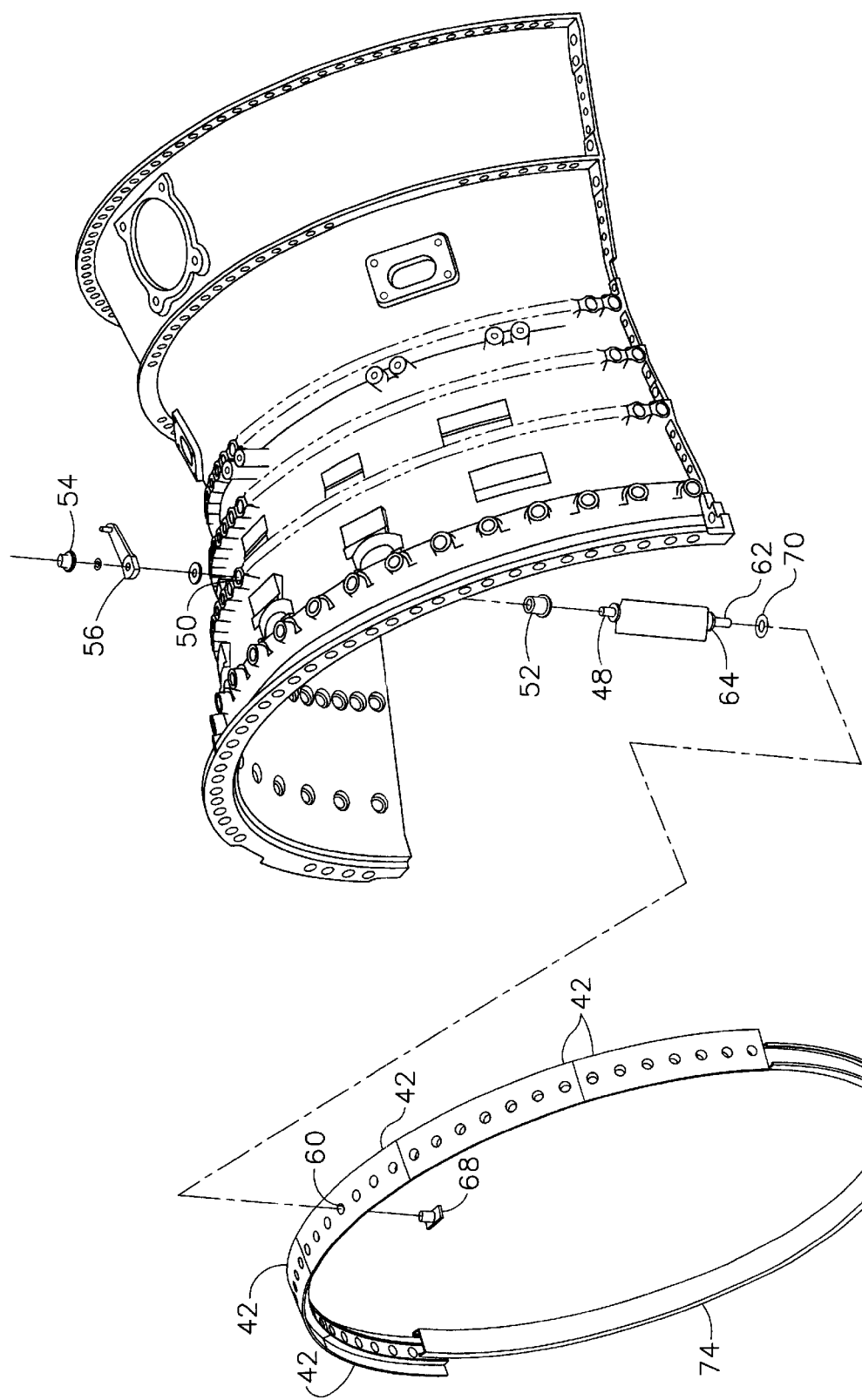
FIG. 3 is a partial exploded perspective view of the inlet guide vane coupling system of the engine of FIG. 1.
Figure 4:
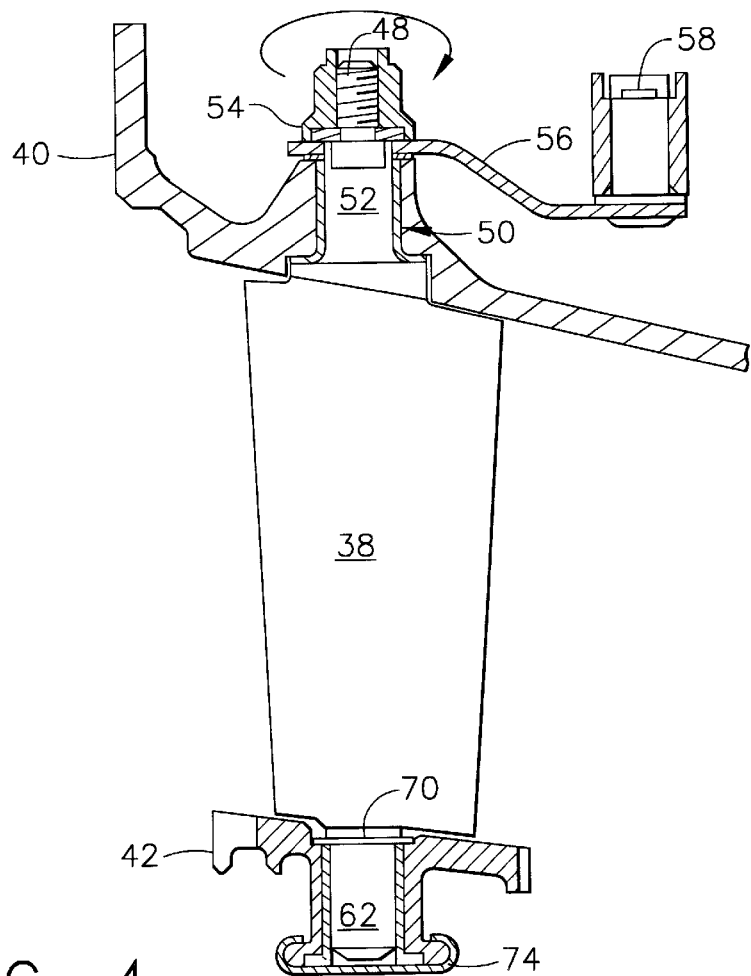
FIG. 4 is a simplified side view of an inlet guide vane and showing the vane-to-shroud coupling mechanism of the present invention.
Figure 5:
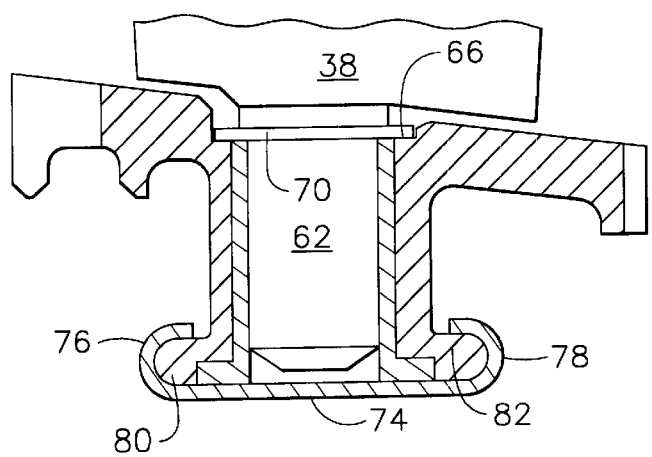
FIG. 5 is a cross-sectional side view of an inlet guide vane showing the vane-to-shroud coupling mechanism of the present invention.
Figure 6:
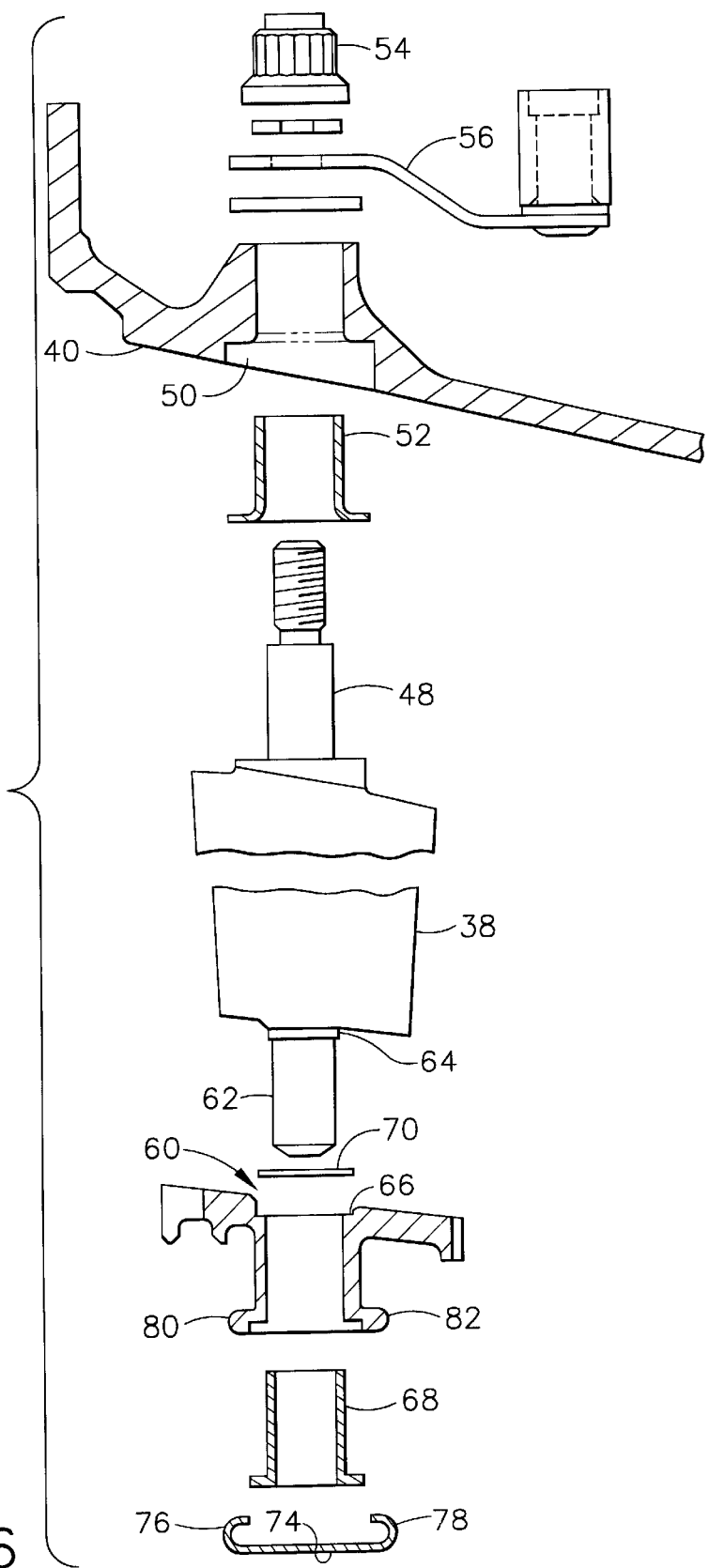
FIG. 6 is an exploded side view of a portion of an inlet guide vane showing the inner trunnion retained by the contact mechanism of the present invention.

Turning to FIGS. 2–4, it is seen that, among other components, the compressor 18 includes an inlet guide vane stage 30 and a set of following variable vane stator stages 32, 34, and 36. The annular dimensions of each of stages 30–36 becomes increasingly smaller to compress the air for use in following engine stages. Each of the stages of the compressor 18 includes a set of circumferentially arranged vanes 38 captured between a stator case 40 of the compressor 18 and a vane shroud 42. As shown particularly in FIG. 3, the shroud 42 is actually formed of a set of shroud sections 42.

The vanes 38 are variably actuated by a set of variable vane actuators 44, 46. The vanes 38 are coupled through the stator case 40 to the actuators 44,46 by way of a vane outer trunnion 48. The outer trunnion 48 passes through a stator case port 50 and is retained by way of an inner bushing 52 and an outer nut 54. A lever arm 56 is captured between the bushing 52 and the outer nut 54. The lever arm 56 is coupled to the vane actuators 44,46 through linkage arms 58.

With reference to FIGS. 3–6, rotation of the vanes 38 is further enabled by the coupling of sets of the vanes 38 to respective ones of the inner vane shroud sections 42. Each shroud section includes a plurality of shroud ports 60, each port 60 designed to accept an inner trunnion 62 of individual ones of the vanes 38. The inner trunnion 62 includes a contact shoulder or trunnion button 64 that resides in a shroud port recess 66 having a recess shoulder. The inner trunnion 62 is initially captured in the port 60 using a shroud bushing 68 that fits in the port 60. A shroud washer 70 forms an intermediate contact area between a bushing face of the trunnion button 64 and a trunnion face of the shroud bushing 68. The washer 70 prevents the shroud section 42 from moving upward and significantly increases the capturing contact area between that capturing component and the inner trunnion 62. This increases the longevity of the guide vane system and reduces maintenance obligations.

The shroud sections 42 are further coupled together with a shroud seal retainer 74. The retainer 74 includes channel sections 76,78 designed to capture shoulders 80,82 of the shroud section 42. The retainer 74 extends approximately one-half of the entire inner circumference of the compressor 18, as shown in FIG. 3. This span of the retainer 74 is substantially greater than the span of the 900 retainers previously in use. It more effectively ties together groups of shroud sections 42 and, thereby, groups of vanes 38. The result is a spoke effect on the interconnected cantilevered vanes 38. The longer span of the retainer 74 also provides improved prevention of movement of the shroud sections 42 downward away from the inner space of the compressor 18. Actuation and vibration effects on the shroud-to-vane interfaces are therefore reduced.

The foregoing has described an improved vane-to-shroud contact arrangement. It may be used with all shroud trunnions, including those vanes with shroud trunnions and bushings that are modified to receive retaining pins. However, with this invention, the vanes and bushings can now all be fabricated without the C-shaped cutouts that generated contaminant entrapment zones and that created shroud lips. While specific embodiments of the present invention have been described, it will be apparent to those skilled in the art that various modifications thereto can be made without departing from the spirit and scope of the invention as defined in the appended claims.

What is claimed is:

1. A contact assembly for retaining a rotatable structure in a port of an inner shroud, said inner shroud being formed of a plurality of accurate sections, the assembly comprising:

a bushing designed to pass through the port of the inner shroud, and to retain the rotatable structure;

a washer disposed within the port and mounted on the bushing; and a retainer removably coupleable to the inner shroud and disposed thereon to capture said bushing between said washer and said retainer, wherein said retainer is a unitary component spanning the plurality of accurate sections.

2. The contact assembly of claim 1 wherein the plurality of accurate sections forms an annulus and said retainer includes a pair of said retainers, wherein each of said retainers spans about one-half of the entire outer circumference of the annulus.

3. In a gas turbine engine having a compressor including an inlet guide vane stage, wherein the inlet guide vane stage includes a plurality of variable guide vanes disposed between a stator casing and an inner vane shroud, said shroud being formed of a plurality of accurate shroud sections, wherein the shroud includes a recessed hole shoulder, for each vane a vane-to-shroud contact assembly comprising:

a bushing removably retained within a port of the vane shroud for receiving a trunnion of the vane;

a washer positioned between a face of said bushing or the recessed hole shoulder of the inner shroud and a trunnion button of the vane; and a shroud sealing retainer removably coupleable to the outer surface of the shroud and disposed thereon to capture said bushing between the shroud and said retainer, wherein said retainer is a unitary component spanning the plurality of accurate shroud sections.

4. The contact assembly of claim 3 wherein the plurality of accurate shroud sections forms an annulus and said retainer includes a pair of said retainers, wherein each of said retainers spans about one-half of the entire outer circumference of the annulus.

5. The contact assembly of claim 3 wherein each of the accurate shroud sections includes opposing shroud shoulders, said retainer including capture channels for retaining the shroud shoulders therein.

6. A method for coupling a guide vane of a compressor of a gas turbine engine to a capturing shroud, said capturing shroud being formed of a plurality of accurate shroud sections and including a recessed hole shoulder, the method comprising the steps of:

applying a washer to an inner trunnion of the guide vane;

capturing said washer between a bushing disposed within a capture port of the shroud or the recessed hole shoulder of the shroud and a lower end of the guide vane; and applying a shroud retainer to the capturing shroud to retain said bushing between said retainer and the shroud, said retainer being formed as a unitary component spanning the plurality of accurate shroud sections.

7. The method of claim 6 wherein the plurality of accurate shroud sections forms an annulus and said retainer includes a pair of said retainers, wherein each of said retainers spans about one-half of the entire outer circumference of the annulus.

8. The method of claim 7 wherein each of the accurate shroud sections includes opposing shroud shoulders, said retainer including capture channels for retaining the shroud shoulders therein.

* * * * *